United States Patent
Obara et al.

(10) Patent No.: US 11,093,846 B2
(45) Date of Patent: Aug. 17, 2021

(54) RATING MODEL GENERATION

(71) Applicant: INTERNATIONAL BUSINESS MACHINES CORPORATION, Armonk, NY (US)

(72) Inventors: Yachiko Obara, Tokyo (JP); Shohei Ohsawa, Tokyo (JP); Takayuki Osogami, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 15/201,068

(22) Filed: Jul. 1, 2016

(65) Prior Publication Data
US 2018/0005124 A1 Jan. 4, 2018

(51) Int. Cl.
*G06N 7/00* (2006.01)
*G06F 17/16* (2006.01)
(Continued)

(52) U.S. Cl.
CPC ........... *G06N 7/005* (2013.01); *G06F 16/335* (2019.01); *G06F 17/16* (2013.01); *G06N 20/00* (2019.01); *G06Q 30/0623* (2013.01)

(58) Field of Classification Search
CPC ...... G06N 20/00; G06N 7/005; G06F 16/335; G06F 17/16; G06Q 30/0623
See application file for complete search history.

(56) References Cited

U.S. PATENT DOCUMENTS 8,175,989 B1 * 5/2012 Gopinath ............... G06N 7/005
706/45
9,691,035 B1 * 6/2017 Sandler .............. G06Q 30/0631
(Continued)

FOREIGN PATENT DOCUMENTS

WO WO2012013996 A1 2/2012

OTHER PUBLICATIONS

Li, Gai, and Qiang Chen."Exploiting explicit and implicit feedback for personalized ranking." Mathematical Problems in Engineering 2016 (2016). (Year: 2016).*
(Continued)

*Primary Examiner* — Li B. Zhen
*Assistant Examiner* — Markus A. Vasquez
(74) *Attorney, Agent, or Firm* — Tutunjian & Bitetto, P.C.; Randall Bluestone (57) ABSTRACT

Rating models may be generated by obtaining a plurality of consumption values, obtaining a plurality of rating values, training a model that estimates consumption values and rating values by utilizing a plurality of consumer attributes for each consumer, a plurality of item attributes for each item, and a plurality of weights for each attribute of each combination of a consumer and an item. Each estimated consumption value is a function of the plurality of weights for each attribute of each combination of each consumer and each item that corresponds with the estimated consumption value, and each estimated rating value is a function of the plurality of consumer attributes of a consumer that corresponds with the estimated rating value, the plurality of item attributes of an item that corresponds with the estimated rating value, and the plurality of weights that corresponds with the estimated rating value.

19 Claims, 7 Drawing Sheets

(51) Int. Cl.
  *G06Q 30/06*   (2012.01)
  *G06N 20/00*   (2019.01)
  *G06F 16/335*  (2019.01)

(56) References Cited

U.S. PATENT DOCUMENTS

| | | |
|---|---|---|
| 2014/0164172 A1 | 6/2014 | Du et al. |
| 2014/0181121 A1 | 6/2014 | Nice et al. |
| 2014/0304277 A1* | 10/2014 | Veugen .................. G06Q 30/02 707/748 |
| 2015/0112830 A1* | 4/2015 | Boulter .................... G06N 5/02 705/26.7 |

OTHER PUBLICATIONS

Duarte-Carvajalino, Julio Martin, and Guillermo Sapiro. "Learning to sense sparse signals: Simultaneous sensing matrix and sparsifying dictionary optimization." IEEE Transactions on Image Processing 18.7 (2009): 1395-1408 (Year: 2009).*

Bottou, Léon. "Large-scale machine learning with stochastic gradient descent." Proceedings of COMPSTAT'2010. Physica-Verlag HD, 2010. 177-186. (Year: 2010).*

Amazon Machine Learning. "Training ML Models", https://docs.aws.amazon.com/machine-learning/latest/dg/training-ml-models.html. Jun. 10, 2016. Accessed via WayBack Machine on May 24, 2019. (Year: 2016).*

Hinton, G. et al., "A fast learning algorithm for deep belief nets," Neural Computation, vol. 18, No. 7, Jul. 2006. (pp. 1-16).

Maccallum, R.M., et al., "Evolution of music by public choice," Proceedings of the National Academy of Sciences of the United States of America, vol. 109, No. 30, Jul. 2012. (pp. 1-6).

* cited by examiner

Rating

|   | Items | | | | | | |
|---|---|---|---|---|---|---|---|
|   | 1 | 2 | 3 | 4 | 5 | 6 | 7 |
| 1 | N/A | N/A | N/A | 1 | N/A | N/A | N/A |
| 2 | N/A | -0.5 | N/A | N/A | N/A | N/A | N/A |
| 3 | N/A | 0 | N/A | 1 | N/A | 0.5 | N/A |
| 4 | N/A | N/A | 0 | N/A | -0.5 | N/A | -0.5 |
| 5 | N/A | -0.5 | N/A | 0.5 | N/A | N/A | N/A |
| 6 | -1 | N/A | N/A | 1 | N/A | 0 | N/A |
| 7 | N/A | -0.5 | N/A | 0.5 | N/A | 0 | N/A |

(Consumers labels rows 1–7)

*FIG.3*

Consuming

|   | \_\_Items\_\_ | | | | | | |
|---|---|---|---|---|---|---|---|
|   | 1 | 2 | 3 | 4 | 5 | 6 | 7 |
| 1 | 0 | 0 | 0 | 1 | 0 | 0 | 0 |
| 2 | 0 | 1 | 0 | 0 | 0 | 0 | 0 |
| 3 | 0 | 1 | 0 | 1 | 0 | 1 | 0 |
| 4 | 0 | 0 | 1 | 0 | 1 | 0 | 1 |
| 5 | 0 | 1 | 0 | 1 | 0 | 0 | 0 |
| 6 | 1 | 0 | 0 | 1 | 0 | 1 | 0 |
| 7 | 0 | 1 | 0 | 1 | 0 | 1 | 0 |

(Rows labeled "Consumers")

RATING MODEL GENERATION

BACKGROUND

Technical Field

The present invention relates to the generation of rating models.

Description of the Related Art

It is critical to provide effective recommendations to users in online stores, social media, and other systems. Some recommender systems ask their users to rate the items to improve the quality of future recommendations. The recommender systems use ratings of items obtained from users to predict ratings that those or other users would give to unrated items.

SUMMARY

According to a first aspect of the present invention, provided is an apparatus including a processor and one or more computer readable mediums collectively including instructions that, when executed by the processor, cause the processor to obtain a plurality of consumption values, wherein each consumption value indicates whether a consumer among a plurality of consumers has rated an item among a plurality of items, obtain a plurality of rating values, wherein each rating value represents a rating of an item by a consumer for each consumption value indicating that the corresponding consumer rated the corresponding item, train a model that estimates consumption values and rating values by utilizing a plurality of consumer attributes for each consumer, a plurality of item attributes for each item, and a plurality of weights for each attribute of each combination of a consumer and an item. Each estimated consumption value is a function of the plurality of weights for each attribute of each combination of each consumer and each item that corresponds with the estimated consumption value, and each estimated rating value is a function of the plurality of consumer attributes of a consumer that corresponds with the estimated rating value, the plurality of item attributes of an item that corresponds with the estimated rating value, and the plurality of weights that corresponds with the estimated rating value. The first aspect may also include a method implemented by the apparatus and a program product for performing the method.

The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
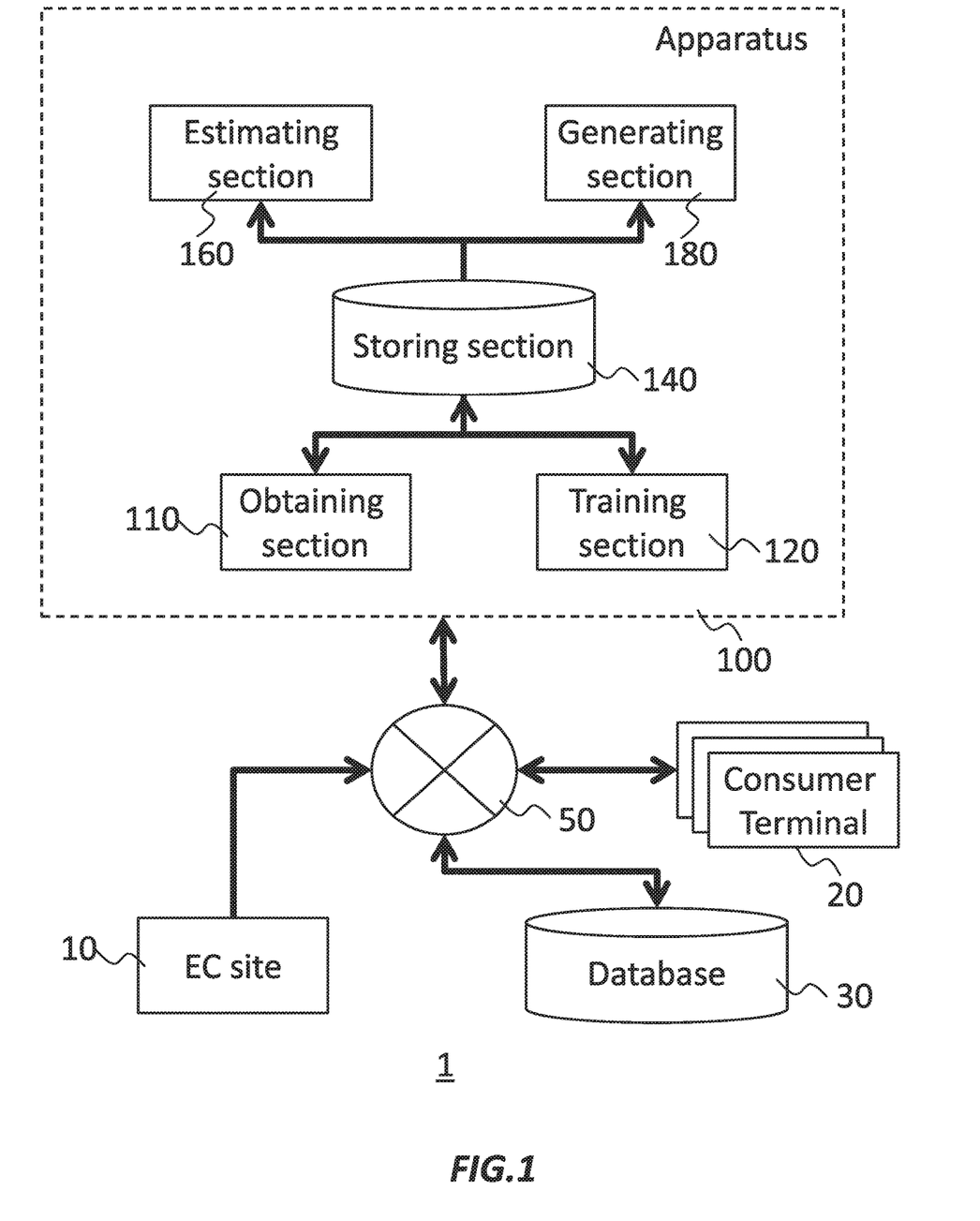
FIG. 1 shows an exemplary configuration of a system 1, according to an embodiment of the present invention.

FIG. 1 shows an exemplary configuration of a system 1 according to an embodiment of the present invention. System 1 may facilitate consumption of items by consumers, generation of a consumption model, and recommendations of items for consumers. The system 1 may comprise an Electronic Commerce (EC) site 10, consumer terminals 20, a database 30, and an apparatus 100. In an embodiment, one or more of the EC site 10, consumer terminals 20, database 30, and apparatus 100 are interconnected at connector 50.

The EC site 10 may be one or more of servers that facilitates trades in products and/or services using computer networks, such as the internet. The EC site 10 may provide one or more web sites for online shopping, online market places, and other B-to-C/C-to-C/B-to-B business.

In one embodiment, the EC site 10 may sell items (e.g., products and/or services) to consumers and receive rating values of the items from the consumers via a website. The EC site 10 may store a plurality of consumption values in the database 30. Each consumption value may be allocated to each combination of an item and a consumer, and indicate whether a consumer among a plurality of consumers has rated an item among a plurality of items.

The EC site 10 may also store the rating values of the items in a database 30. Each rating value may be allocated to each combination of an item and a consumer, and represent a rating of an item by a consumer for each consumption value indicating that the corresponding consumer rated the corresponding item.

The EC site 10 may generate the consumption values based on the rating values. In one embodiment, the EC site 10 may allocate a consumption value "1" to combinations of an item and a consumer in response to determining that the rating value corresponding to the combination has already been stored in the database 30, and "0" to other combinations.

In one embodiment, the system 1 may comprise another entity to provide items to consumers, in addition to/in substitution for the EC site 10. In the embodiment, the system 1 may comprise a computer to provide social networking service, administrative service, or other services in relation to items.

The consumer terminals 20 may be terminal computers used by consumers, and may be implemented by a server computer, a desktop computer, a laptop computer, a mobile computer, a mobile phone, a smartphone, a wearable device, or other types of computers. The consumer may use an item with or without consumption of the item. The consumer terminals 20 may receive buying orders of items from consumers, and transmit the orders to the EC site 10. The consumer terminals 20 may also receive the rating values of items from consumers, and transmit the rating values to the EC site 10.

The database 30 may be one or more computers that store the rating values of items. The database 30 may also store the consumption values of the items. In one embodiment, the database 30 may be a database server.

The apparatus 100 of the present embodiment obtains rating values and consumption values, and generates a model to explain the consumption and rating of items by consumers based on these values. The apparatus 100 may comprise a processor and one or more computer readable mediums collectively including instructions. The instructions, when executed by the processor, may cause the processor to operate as a plurality of operating sections. Thereby, the apparatus 100 may be regarded as comprising an obtaining section 110, a training section 120, a storing section 140, an estimating section 160, and a generating section 180.

The obtaining section 110 may obtain a plurality of consumption values and a plurality of rating values from the database 30. The obtaining section 110 may store the plurality of consumption values and the plurality of rating values in the storing section 140, or provide at least part of these values to the training section 120.

The training section 120 may train a model that estimates consumption values and rating values by utilizing a plurality of consumer attributes for each consumer, a plurality of item attributes for each item, and a plurality of weights for each attribute of each combination of a consumer and an item.

The plurality of item attributes of an item may represent a plurality of features of the item focused on when consumers give rating values to items, and the plurality of consumer attributes of a consumer may represent a preference of the consumer to the features of items corresponding to the item attributes. The plurality of weights may be applied to a combination of the plurality of consumer attributes and the plurality of item attributes when estimating the rating values. Further details of the model and the training thereof is explained below.

The training section 120 may store the trained model in the storing section 140. In one embodiment, the training section 120 may store the plurality of consumer attributes for each consumer, the plurality of item attributes for each item, and the plurality of weights for each attribute of each combination of a consumer and an item in the storing section 140.

The storing section 140 may store a variety of data used for operations of the apparatus 100. The storing section 140 may comprise a volatile or non-volatile memory.

The estimating section 160 may estimate rating values based on the model trained by the training section 120. In one embodiment, the estimating section 160 may estimate rating values of the consumer and each item that may not be actually rated by consumers. Further details of the operations of the estimating section 160 are explained below. The estimating section 160 may store the predicted rating values in the storing section 140.

The generating section 180 may generate a recommendation of an item to a consumer based on the estimated rating values of the consumer and each item. The generating section 180 may store information of the recommendation in the storing section 140 and/or provide information of the recommendation to the EC site 10.

The generating section 180 may also generate an item that maximizes a rating value or a sum of rating values of one or more consumers based on the model trained by the training section 120. The detail of operations of the generating section 180 is explained below. The generating section 180 may store information of the generated item in the storing section 140 and/or provide information of the generated item to the EC site 10.

Figure 2:
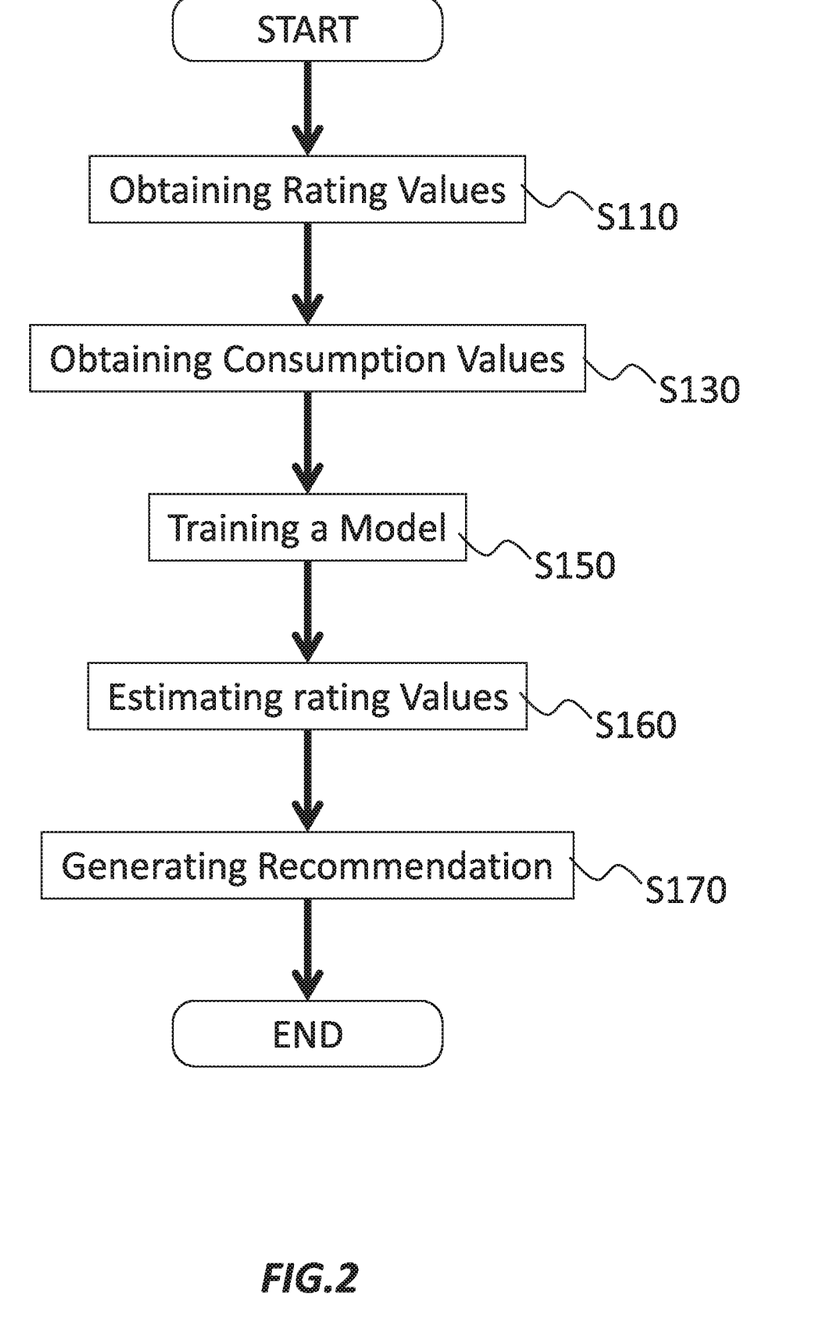
FIG. 2 shows an operational flow according to an embodiment of the present invention.

FIG. 2 shows an operational flow according to an embodiment of the present invention. The present embodiment describes an example in which an apparatus, such as the apparatus 100, performs the operations from S110 to S170, as shown in FIG. 2. The apparatus may generate a model by performing the operations of S110-S170.

At S110, an obtaining section such as the obtaining section 110 may obtain a plurality of rating values. In one embodiment, the obtaining section may receive a rating value from a consumer who bought an item from an Electronic Commerce (EC) site, such as the EC site 10, directly or via a database, such as the database 30. In one embodiment, the obtaining section may obtain rating values for each combination of items and consumers. The rating value may take a discrete value (e.g., an integer in a range of 1-5) or a continuous value (e.g., a real number in a range of 1-5).

Figure 3:
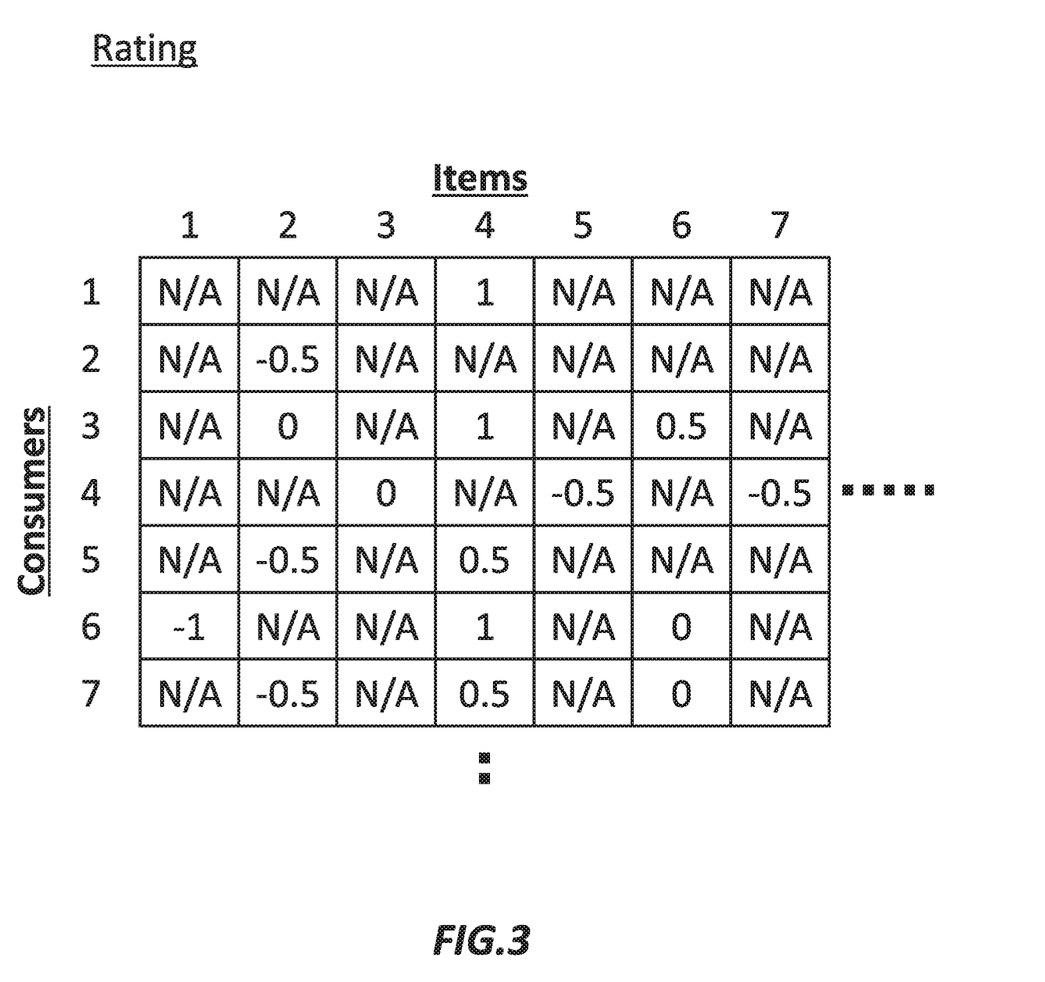
FIG. 3 shows rating values, according to an embodiment of the present invention.

FIG. 3 shows rating values that the obtaining section may obtain, according to an embodiment of the present invention. FIG. 3 shows the rating values for combinations of item 1, item 2, . . . , item 7 and consumer 1, consumer 2, . . . , consumer 7. For example, the consumer 1 has consumed an item 4 and rated "1" for the item 1, and the consumer 2 has consumed an item 2 and rated "−0.5" for the item 2. As shown in the figure, the consumers may rate only some of the items, since consumers usually do not consume all items. For example, the obtaining section may not obtain the rating value of the item 1 and the consumer 1, and so the rating value of the item 1 and the consumer 1 is shown as "N/A." This may mean that the consumer 1 has not yet consumed the item 1.

The rating values of FIG. 3 may be based on the 5-point scale (i.e., −1, −0.5, 0, 0.5, 1). In other embodiments, the obtaining section may obtain the rating values in other scales (e.g., a scale of 1 to 5) and normalize the obtained rating values to a −1 to 1 scale for a later model generation. The obtaining section may store the plurality of rating values in a storing section, such as the storing section 140, or provide the plurality of rating values to a training section, such as the training section 120. Hereinafter a rating value for consumer i and item j may be referred to as $r_{ij}$.

Next at S130, an obtaining section such as the obtaining section 110 may obtain a plurality of consumption values from the database 30. In one embodiment, the obtaining section may obtain consumption values for each combination of items and consumers. The consumption value may take a value of "1" or "0" where "1" indicates that the item has been consumed by the consumer and "0" indicates that the item has not been consumed by the consumer.

The obtaining section may generate the plurality of consumption values based on the plurality of rating values. In one embodiment, the obtaining section may update a consumption value in response to receiving the rating value that corresponds with the consumption value. In the embodiment, the obtaining section may refer to the rating values, and allocate "1" to a combination of a consumer and an item in response to determining that the item has been rated by the consumer, and "0" to a combination of a consumer and an item in response to determining that the rating value of the item by the consumer is "N/A."

Figure 4:
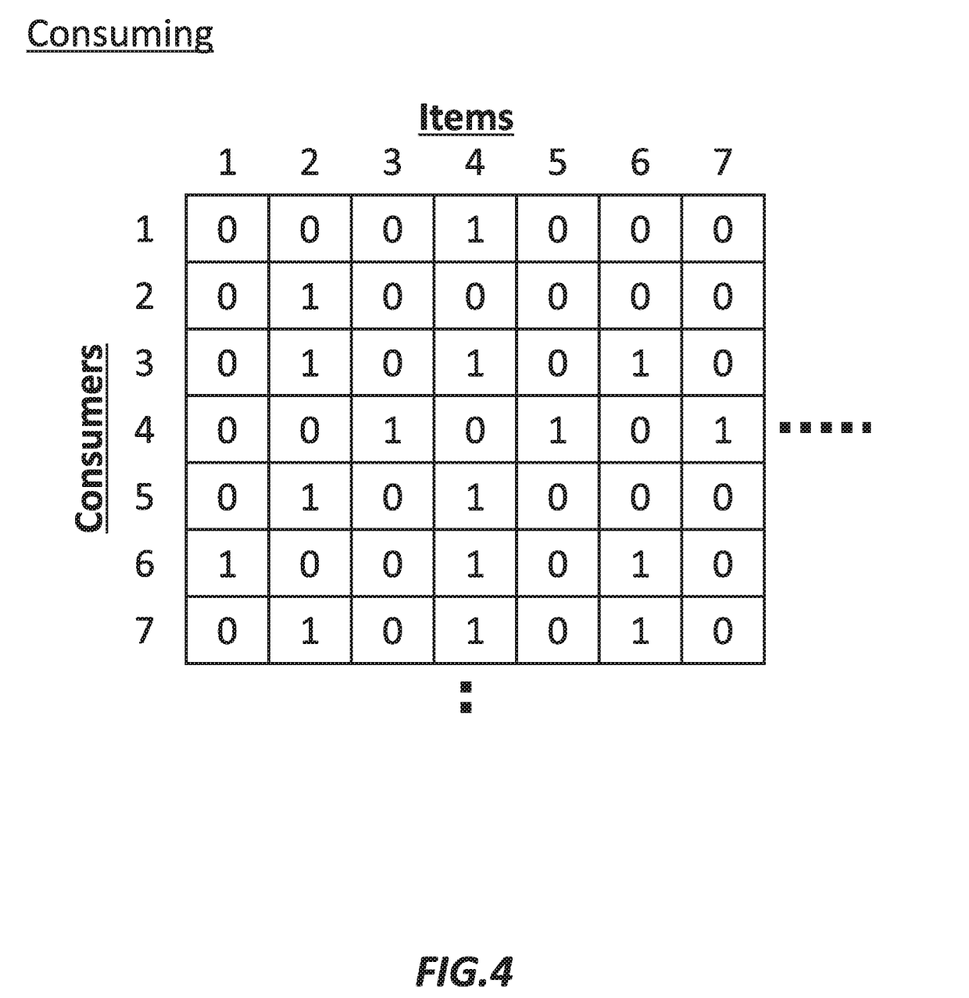
FIG. 4 shows consumption values, according to an embodiment of the present invention.

FIG. 4 shows consumption values, according to an embodiment of the present invention. FIG. 4 shows consumption values for combinations of item 1, item 2, . . . , item 7 and consumer 1, consumer 2, . . . , consumer 7. The obtaining section may store the plurality of consumption values in the storing section, or provide the plurality of consumption values to the training section. Hereinafter, a consumption value for consumer i and item j may be referred to as $c_{ij}$.

Next at S150, the training section may train a model for estimating consumption values and rating values by utilizing a plurality of consumer attributes for each consumer, a plurality of item attributes for each item, and a plurality of weights for each attribute of each combination of a consumer and an item.

First, the training section may determine hyperparameters $\Omega$ ($\Omega \equiv \sigma_r^2, \sigma_u^2, \sigma_v^2, a_g, b_g, a_h, b_h, \lambda_c$) before start the training. The training section may receive values of hyperparameters $\Omega$ from a user of the apparatus. In one embodiment, the training section may use a loss function for the training. The loss function E may be represented as shown in formulae (1)-(3) below:

$$E = \lambda_c E_C + E_R, \quad (1)$$

$$E_C \equiv \|C \cdot \text{Log}\tilde{C} + (1-C) \cdot \text{Log}(1-\tilde{C})\|_1 + a_g \|\text{Log}G\|_1 + \\ b_g \|\text{Log}(1-G)\|_1 + a_h \|\text{Log}H\|_1 + b_h \|\text{Log}(1-H)\|_1 + const., \quad (2)$$

$$E_R \equiv \frac{1}{2\sigma_r^2} \|C \cdot (R - \tilde{R})\|_F^2 + \frac{1}{2\sigma_u^2} \|U\|_F^2 + \frac{1}{2\sigma_v^2} \|V\|_F^2, \quad (3)$$

where a matrix $C \in \{0,1\}^{N \times M}$ has a consumption value $c_{ij}$ in i-th row and j-th column, a matrix $R \in [-1,1]^{N \times M}$ has a rating value $r_{ij}$ in i-th row and j-th column for $i \in N$ and $j \in M$, $\text{Log}(\bullet)$ is an element-wise natural logarithm function for a matrix, 1 is a matrix with element being 1, $\|\bullet\|_F$ is a Frobenius norm, $\|\bullet\|_1$ is a $1_1$ norm, $X_1 \circ X_2$ is Hadamard product of $X_1$ and $X_2$, "const." includes the terms that depend only on the hyperparameters $\Omega$, $\lambda_c$ may be a hyperparameter defined having a real number equal to or greater than 0.

a matrix $\tilde{C} \in [-1,1]^{N \times M}$ and a matrix $\tilde{R} \in [-1,1]^{N \times M}$ are represented by:

$$\tilde{C} = G^T H \quad (4),$$

$$\tilde{R} = \tilde{C}^\# \circ (G \circ U)^T (H \circ V) \quad (5),$$

where $U = (u_1, \ldots, u_i, \ldots, u_N)$, $V = (v_1, \ldots, v_j, \ldots, v_M)$, $G = (g_1, \ldots, g_i, \ldots, g_N)$, $H = (h_1, \ldots, h_j, \ldots, h_M)$, $\bullet^\#$ is an inverse matrix for Hadamard product (i.e., $X \circ X^\# = 1$ for a matrix X).

The matrix R corresponds to rating values actually input by the consumers. Here, since the actual rating values have "N/As" as shown in FIG. 3, the training section may substitute other values for "N/A" in the matrix R before starting the training of S150. In one embodiment, the other value for "N/A" may be a smaller value than other rating values and may be the minimal rating value, an average of the all rating values of the consumer or all consumers, a median rating value, or a values selected from the minimal rating value and average of the rating values/the median rating value. In other embodiments, the other value for "N/A" may be selected from random numbers.

The vector $u_i$ includes a plurality of values $u_{i1}, u_{i2}, \ldots, u_{iL}$ as a plurality of consumer attributes of a consumer $i(\in N)$, where L represents a number of attributes and is selected from integers greater than 1. The vector $v_j$ includes a plurality of values $v_{j1}, v_{j2}, \ldots, v_{jL}$ as a plurality of item attributes of an item $j(\in M)$. The vector $v_j$ may represent features of the item j focused on when consumers rate items, such as size, function, price, color, manufacture, etc. However, since the vector $v_j$ is not initially given, and trained at the operation of S150, meanings of a plurality of values $v_{j1}, v_{j2}, \ldots, v_{jL}$ may not clearly correspond to features of items. The vector $u_i$ may represent preference to each feature of the items when consumers rate items. In one embodiment, a consumer attribute $u_{i1}$ may represent a preference of the consumer i to 1-th feature of items.

The vector $g_i$ includes a plurality of values $g_{i1}, g_{i2}, \ldots, g_{iL}$ as a plurality of consumer weights of a consumer $i(\in N)$. The vector $h_j$ includes a plurality of values $h_{j1}, h_{j2}, \ldots, h_{jL}$ as a plurality of item weights of an item $j(\in M)$. The vector $h_j$ may represent features of the item j focused on when consumers consume items (e.g., at points of purchase or selection of the items). The vector $g_i$ may represent an attention to each item weight of the items. In one embodiment, a consumer weight $g_{il}$ of a consumer i may represent an attraction of the consumer i to a feature corresponding to an item weight $h_{jl}$ of the item j, when the consumer i consumes the item j.

The matrix $\tilde{C}$ is an N×M matrix, and has an estimated consumption value $\tilde{c}_{ij}$ in the i-th row and the j-th column. As shown in the formula (4), $\tilde{C}$ is a product of G (which includes a plurality of consumer weights $g_{i1}, \ldots, g_{il}, \ldots, g_{iL}$) and a transposed matrix of H (which includes a plurality of item weights $h_{j1}, \ldots, h_{jl}, \ldots, h_{jL}$). Therefore, each estimated consumption value $\tilde{c}_{ij}$ is a function of the plurality of weights $(g_{i1}h_{j1}, g_{i2}h_{j2}, \ldots, g_{il}h_{jl}, \ldots g_{iL}h_{jL})$ for each attribute of each combination of each consumer i and each item j that corresponds with the estimated consumption value $\tilde{c}_{ij}$.

The matrix $\tilde{R}$ is an N×M matrix, and has an estimated rating value $\tilde{r}\_ij$ in i-th row and j-th column. As shown in the formula (5), $\tilde{R}$ is derived froze a product of a transposed matrix of a Hadamard product of G and U, AND, a Hadamard product of H and V. Therefore, each estimated rating value $\tilde{r}\_ij$ is a function of the plurality of consumer attributes ui of a consumer i that corresponds with the estimated rating value $\tilde{r}\_ij$, the plurality of item attributes vj of an item j that corresponds with the estimated rating value $\tilde{r}\_ij$, and the plurality of weights (gi1hj1, gi2hja2, . . . , gilhjl, . . . ,giLhjL.,) that corresponds with the estimated rating value $\tilde{r}\_ij$.

The estimated rating value $\tilde{r}_{ij}$ of an item i and a consumer j is based on a sum of products of a consumer attribute $u_{il}$, a consumer weight $g_{i1}$, an item attribute $v_{j1}$, and an item weight $g_{j1}$ for each attribute 1 that corresponds with the item i and the consumer j.

Here, $g_{i1}h_{j1}$ is defined as a weight for each attribute 1 of each combination of a consumer i and an item j. The plurality of weights $(g_{i1}h_{j1}, g_{i2}h_{j2}, \ldots, g_{il}h_{jl}, \ldots, g_{iL}h_{jL})$ is based on a plurality of consumer weights $g_{i1}, \ldots, g_{il}, \ldots, g_{iL}$ of a consumer i that corresponds with the plurality of weights and a plurality of item weights $h_{j1}, \ldots, h_{jl}, \ldots, h_{jL}$ of an item j that corresponds with the plurality of weights. The weight $g_{il}h_{jl}$ of the plurality of weights $(g_{i1}h_{j1}, g_{i2}h_{j2}, \ldots, g_{il}h_{jl}, \ldots, g_{iL}h_{jL})$ is based on a product of a consumer weight $g_{il}$ and an item weight $h_{jl}$ that correspond with the weight $g_{il}h_{jl}$.

As indicated by the formulae (1)-(6), the loss function E may be based on a difference between the consumption data C and the estimated consumption data $\tilde{C}$ and a difference between the rating data R and the estimated rating data $\tilde{R}$.

The training of the model by the training section may include minimizing a loss function E by updating a plurality of consumer attributes $u_{i1}, u_{i2}, \ldots, u_{iL}$ of each consumer i, a plurality of item attributes $v_{j1}, v_{j2}, \ldots, v_{jL}$ of each item j, and a plurality of weights $(g_{i1}h_{j1}, g_{i2}h_{j2}, \ldots, g_{il}h_{jl}, \ldots g_{iL}h_{jL})$ for each attribute 1 of each combination of a consumer i and an item j. The training section may update a plurality of consumer weights $g_{i1}$ of each consumer i for each attribute 1 and a plurality of item weights $h_{j1}$ of each item j for each attribute 1, instead of a plurality of weights $(g_{i1}h_{j1}, g_{i2}h_{j2}, \ldots, g_{il}h_{jl}, \ldots, g_{iL}h_{jL})$.

In one embodiment, the training section may perform the training of a model by minimizing the loss function E by using a stochastic gradient descent method.

In the embodiment, before performing the stochastic gradient descent method, the training section may first perform sampling of $u_{i1}, u_{i2}, \ldots, u_{iL}$ and $v_{j2}, \ldots, v_{jL}$ according to the following 0 mean normal distributions:

$p(u_i|\sigma_u^2) = N(u_i|0,\sigma_u^2 I)$, $p(v_j|\sigma_v^2) = N(v_j|0,\sigma_v^2 I)$ In the embodiment, the training section may also perform sampling of $g_{i1}, g_{i2}, \ldots, g_{iL}$ and $h_{j1}, h_{j2}, \ldots, h_{jL}$ according to the following Beta distributions:

$p(g_{ik}|a_g,b_g) = \text{Beta}(g_{ik}|a_g,b_g)$, $p(h_{jk}|a_h,b_h) = \text{Beta}(h_{jk}|a_h,b_h)$, where $\text{Beta}(q|a,b) \equiv q^a(1-q)^b/Z(a+1, b+1)$ for $q \in (0, 1)$, $a>0$, $b>0$, and Z denotes the Beta function.

After performing the sampling, the training section may differentiate the loss function E with respect to each of a plurality of consumer attributes $u_i$ of each consumer i, a plurality of item attributes $v_j$ of each item j, a plurality of consumer weights $g_i$ of each consumer i, and a plurality of item weights $h_j$ of each item j. The training section may obtain gradients of the loss function E in each direction as a result of differential. The training section may repeatedly update values of $u_i$, $v_j$, $g_i$, $h_3$ according to the gradients so as to minimize the loss function E.

Figure 5:
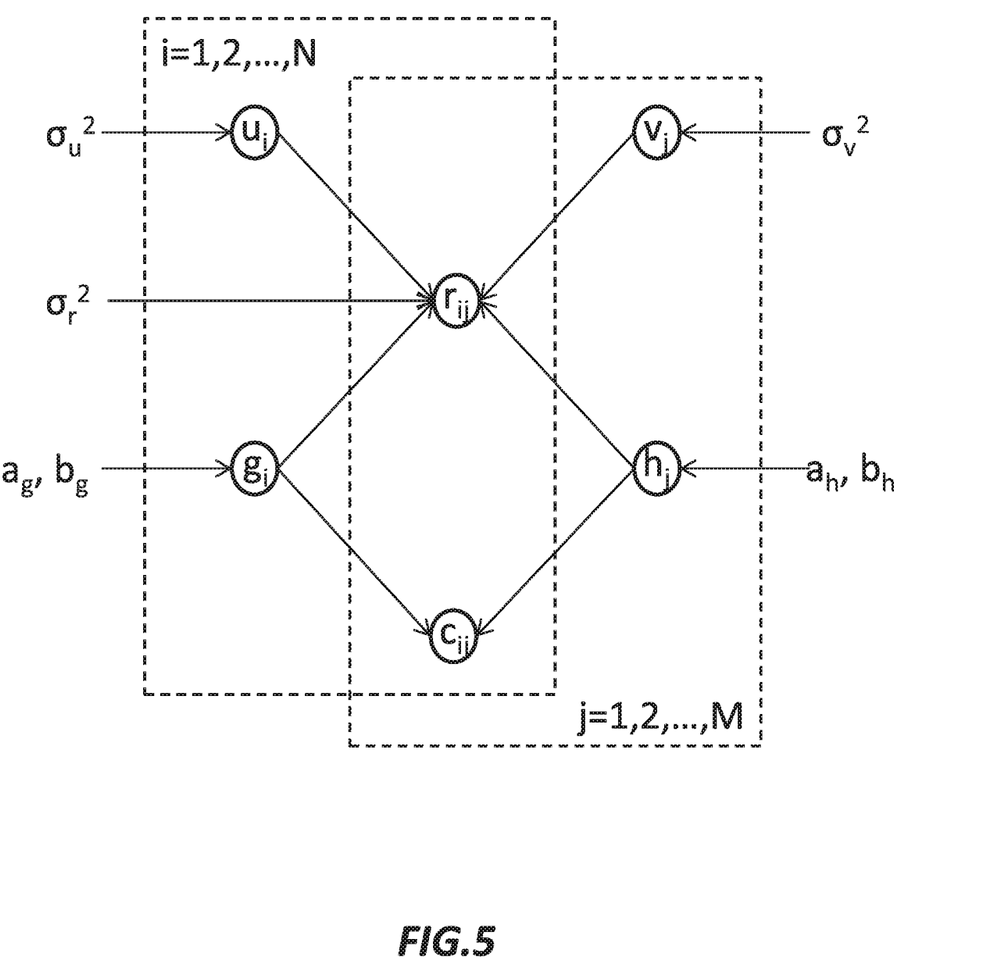
FIG. 5 shows a consumption-rating model according to an embodiment of the present invention.

FIG. 5 shows a consumption-rating model according to an embodiment of the present invention. The model trained at the operation of S150 may be represented by the consumption-rating model in FIG. 5. In the model, a rating value $r_{ij}$ and a consumption value $c_{ij}$ are given to reflect actual rating values of an item j by a consumer i, while a plurality of consumer attributes $u_i$, a plurality of item attributes $v_j$, a plurality of consumer weights $g_i$, and a plurality of consumer weights $h_j$ are determined by the training section to reflect $r_{ij}$ and $c_{ij}$.

In the model, the consumption value $c_{ij}$ depends on the plurality of consumer weights $g_i$ and the plurality of consumer weights $h_j$. This is indicated by the formula (4). In the model, the rating value $r_{ij}$ depends on the plurality of consumer attributes $u_i$, the plurality of item attributes $v_j$, the plurality of consumer weights $g_i$, and the plurality of consumer weights $h_j$. This is indicated by the formula (5). Before performing the stochastic gradient descent method, the consumer attributes $u_i$ is sampled from a distribution having a variance $\sigma_u^2$, and the item attributes $v_j$ is sampled from a distribution having a variance $\sigma_v^2$. The consumer weights $g_i$ is also sampled from a Beta distribution having parameters $a_g$ and $b_g$, and the item weights $h_j$ is sampled from Beta distribution having parameters $a_h$ and $b_h$.

The training section may store the result of training at S150 in the storing section 140. In one embodiment, the training section may store $u_i$, $v_j$, $g_i$, and $h_j$ obtained by the training in the storing section.

Next at S160, an estimating section such as the estimating section 160 may estimate rating values of the plurality of items by the plurality of consumers based on the model trained at S160. In one embodiment, the estimating section may estimate rating values of each combination of an item and a consumer, in which the obtaining section has not obtained at S110, such as a rating value shown as "N/A" in FIG. 3.

The estimating section may estimate a rating value $\tilde{r}_{ij}$ based on formulae (7)-(8) by using $u_i$, $v_j$, $g_i$, and $h_3$ obtained at the operation of S150.

$$\tilde{r}_{ij} = u_i^T \Gamma_{ij} v_j, \qquad (7)$$

$$\Gamma_{ij} = \frac{1}{g_i^T h_j} \begin{pmatrix} g_{i1}h_{j1} & \cdots & 1 \\ \vdots & \ddots & \vdots \\ 1 & \cdots & g_{iL}h_{jL} \end{pmatrix}, \qquad (8)$$

The estimating section may store the result of the estimation (e.g., estimated rating values) in the storing section.

Next at S170, a generating section such as the generating section 180 may generate a recommendation of an item to a consumer based on the estimated rating values of the consumer and each item. In one embodiment, the generating section may compare a threshold value $r_{th}$ and the estimated rating value $\tilde{r}_{ij}$ of an item j and a consumer i stored in the storing section, and generate a recommendation of an item j for a consumer i if $\tilde{r}_{ij}$ exceeds $r_{th}$.

The generating section may also generate a recommendation of an item for a plurality of consumers (e.g., all consumers) based on a sum of the estimated rating values of each corresponding item. In one embodiment, the generating section may compare a threshold value $r_{th}$ and a sum or an average of estimated rating values $\tilde{r}_{1j}, \tilde{r}_{2j}, \ldots, \tilde{r}_{Nj}$ of an item j stored in the storing section, and may generate a recommendation of an item j for the plurality of consumers if the sum or average exceeds $r_{th}$.

As explained above, the apparatus of the above embodiments trains the model having not only the consumer attributes $u_i$ and the item attributes $v_j$, but also the consumer weights $g_i$ and the item weights $h_j$. Meanwhile, the Probabilistic matrix factorization (PMF) is based on a generative model where a rating value given by a consumer on an item follows a distribution that depends only on latent preferences of the consumer attributes $u_i$ and latent features of the item (e.g., the item attributes $v_j$). PMF does not take into account a relationship between why a consumer consumes an item and how that affects the consumer's rating.

On the other hand, according to the model trained by the apparatus of the foregoing embodiments, the consumer may consume an item with a probability that depends on what features the consumer seeks (e.g., the consumer weights $g_i$, which may be considered as attention of the consumer) and what features the item emphasizes (the item weights $h_j$, which may be considered as attraction of the item). From another perspective, the item attributes $v_j$ may represent features of the item j focused on before consumption and the consumer attributes $u_i$ may represent preferences of the consumer i corresponding to $v_j$ before the consumption, while the item weights $h_j$ may represent features of the item j focused on after consumption and the consumer weights $g_i$ may represent preferences of the consumer i corresponding to $h_j$ after the consumption.

According to the foregoing embodiments, the apparatus generates a model that takes into account the relationship between the consumption and rating of items. Specifically, in the model trained by the apparatus of the above embodiments, a probability density function (PDF) of the rating value is given by:

$$p(r_{ij}|u_i,v_j,g_i,h_j,\sigma_r^2) = N(r_{ij}|u_i^T \Gamma_{ij} v_j, \sigma_r^2) \qquad (9).$$

Therefore, the apparatus may more precisely estimate rating values of consumers on items and generate effective recommendation of items for consumers.

In some embodiments, the apparatus may use only one of $g_i$ and $h_j$, rather than both. In such embodiments, the apparatus may use vectors having predetermined constant values (e.g., 0, 0.5, or 1) as their elements instead of $g_i$ and $h_j$.

In some embodiments, the consumers may give rating values only for some of the items that they have consumed. In such embodiments, the obtaining value may allocate prescribed values (e.g., minimal rating values such as "−1" or median rating values such as "0") to rating values for items that have been consumed but not rated.

Figure 6:
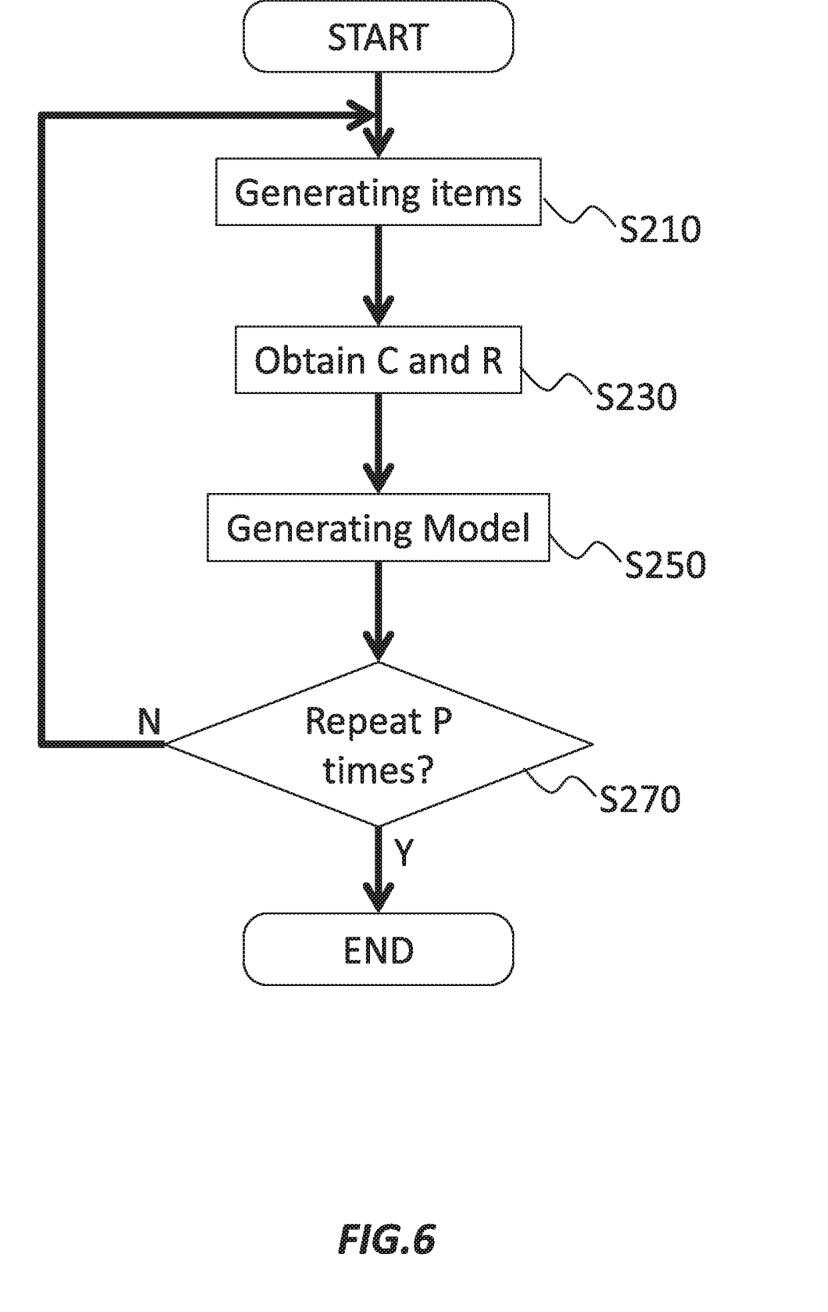
FIG. 6 shows an operational flow according to an embodiment of the present invention.

FIG. 6 shows an operational flow according to an embodiment of the present invention. The present embodiment describes an example in which an apparatus, such as the apparatus 100, performs the operations from S210 to S270, as shown in FIG. 2. The apparatus may update a model and generate items by performing the operations of S210-S270.

At S210, a generating section, such as the generating section 180, may generate an item that maximizes a rating value or a sum of rating values of one or more consumers based on the plurality of item attributes of each item and rating values that correspond with each item. In one embodiment, the generating section may determine $v_j$ and $h_j$ such that an estimated rating value $\tilde{r}_{ij}$ for a consumer i is maximized or exceeds a threshold value $r_{th}$. In another embodiment, the generating section may determine $v_j$, and $h_j$ such that a sum or an average of estimated rating values $\tilde{r}_{1j}, \tilde{r}_{2j}, \tilde{r}_{Nj}$ for a plurality of consumers 1, . . . , N is maximized or exceeds a threshold value $r_{th}$.

The generating section may also randomly generate an item in addition to the item for maximizing the rating value. In one embodiment, the generating section may randomly determine values of $v_{jl}$ and $h_{jl}$ for each attribute l for an item j.

Then the generating section may generate an item having features that correspond to the determined $v_j$, and $h_j$. In one embodiment, the generating section may generate an art work such as a text, a novel, a painting, an image, a video, a musical composition, etc., as the item. In the embodiment of a musical composition, features corresponding to the determined $v_j$ and $h_j$ may be an arrangement of musical notes in a chart, a tempo, a time signature, a type of instrument, etc. Each item generated by the generating section may be data to be presented to a consumer. The generating section may present the generated item directly or via the EC site and/or the database to a consumer terminal such as the consumer terminal 20.

The generating section may generate a plurality of items at each iteration of S210. The generating section may provide an EC site, such as the EC site 10, and the generated items may be proposed to consumers via the EC site. The consumers may consume at least some of the items and provide rating values for the consumed items.

Next, at S230, an obtaining section, such as the obtaining section 110, may obtain consumption values and rating values of items by consumers. The obtaining section may perform the operation of S230 in the same manner as the operations of S110 and S130 explained in relation to FIG. 2.

Next, at S250, a training section, such as the training section 120, may train a model based on the obtained rating values and consumption values. The training section may perform the operation of S250 in the same manner as the operation of S150 explained in relation to FIG. 2.

Next at S270, the training section may determine whether the operations of S210-S250 have been repeated a threshold number of times. If the decision is positive, then the training section ends the operational flow. If the decision is negative, then the training section may go back to the operation of S210 to generate more items.

According to the operational flow of FIG. 6, the apparatus may refine items, such as art work, to fit to consumers' preferences with each iteration of S210-S250. Thereby, the apparatus may generate items comfortable to consumers by the end of the flow.

According to this embodiment, consumption values $c_{ij}$ represents whether or not a consumer i consumes an item j and takes a value of 0 or 1. In other embodiments, consumption values $c_{ij}$ represent how many times a consumer i consumes an item j, and may take a number of consumptions, a frequency of consumption, or a value relating thereto.

In other embodiments, the training section may train a model having first consumption values $c_{1\_ij}$ that represent whether or not a consumer i consumes an item j and takes a value of 0 or 1 AND second consumption values $c_{2\_ij}$ that represent whether or not a consumer i gives a rating value to an item j and takes a value of 0 or 1.

Figure 7:
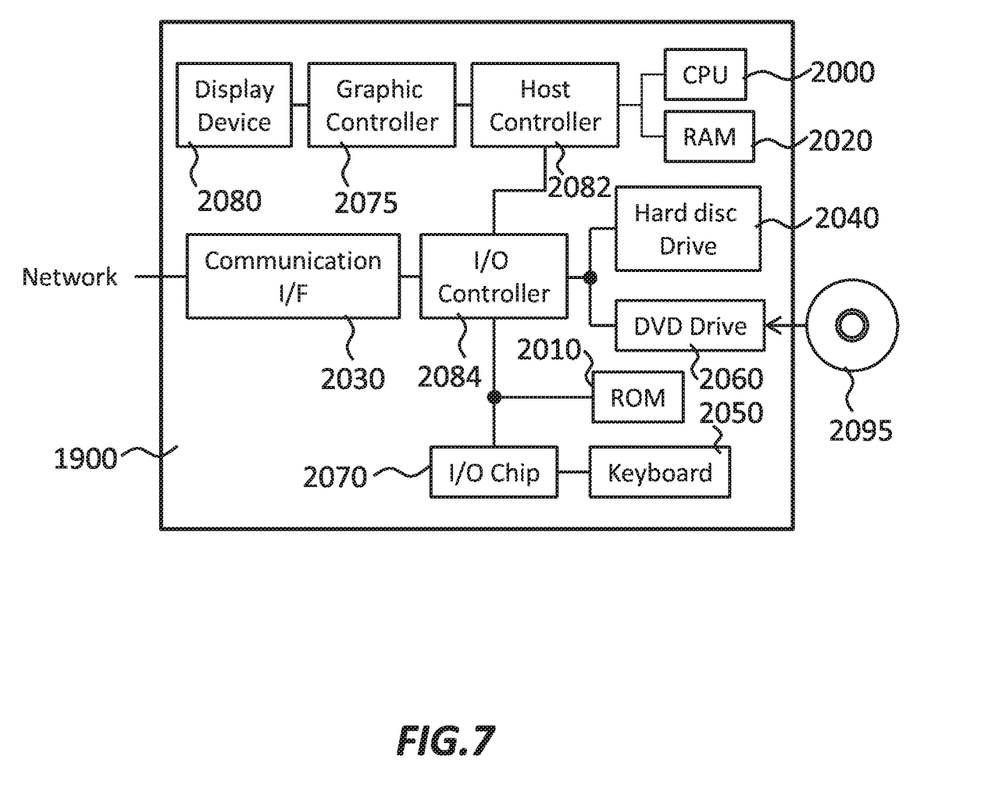
FIG. 7 shows an exemplary hardware configuration of a computer 1900 that functions as a system, according to an embodiment of the present invention.

FIG. 7 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as apparatus 100 of FIG. 1, includes an obtaining section, a training section, a storing section, an estimating section, a generating section. The program or module acts on the CPU 2000, to cause the computer 1900 to function as a an obtaining section, a training section, a storing section, an estimating section, a generating section, such as the obtaining section 110, the training section 120, the storing section 140, the estimating section 160, and the generating section 180 described above.

The information processing described in these programs is read into the computer 1900, to function as an obtaining section, a training section, a storing section, an estimating section, and a generating section, which are the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storing section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An apparatus comprising:
   a processor; and
   one or more computer readable mediums collectively including instructions that, when executed by the processor, cause the processor to:
      obtain a plurality of consumption values, wherein each consumption value indicates whether a consumer among a plurality of consumers has rated an item among a plurality of items;
      obtain a plurality of rating values, wherein each rating value represents a rating of an item by a consumer for each consumption value indicating that the corresponding consumer rated the corresponding item;
train a model that generates an estimated consumption value and estimated rating value by utilizing a plurality of consumer attributes for each consumer that represent preferences of consumers before consumption, a plurality of item attributes for each of the plurality of items that represent a plurality of features of each of the plurality of items focused on before consumption, and a plurality of weights for each attribute of each combination of a consumer and an item that represent features of the items focused on before consumption and preferences after consumption,
wherein the training a model includes minimizing a loss function by updating a vector of consumer attributes $u_i$ for each consumer i, a vector of item attributes $v_j$ for each item j, a vector of consumer weights $g_i$ for each consumer i, and a vector of item weights $h_i$ for each item i, wherein the loss function is based on a difference between the consumption data (C) and the estimated consumption data ($\tilde{C}$) and a difference between the rating data (R) and the estimated rating data($\tilde{R}$), wherein $\tilde{R}$ is an N×M matrix represented as follows:

$$\tilde{R} = \tilde{C}^{\#} \circ (G \circ U)^T (H \circ V)$$

where $U=(u_i, \ldots, u_j, \ldots, u_N)$, $V=(v_i, \ldots, v_j, \ldots, v_M)$, $G=(g_i, \ldots, g_j, \ldots, g_N)$, $H=(h_i, \ldots, h_j, \ldots, h_M)$, is an inverse matrix for a Hadamard product, N is a number of consumers, and M is a number of items
wherein each estimated consumption value is a function of the plurality of weights for each attribute of each combination of each consumer and each item that corresponds with the estimated consumption value, each estimated rating value is a function of the plurality of consumer attributes of a consumer that corresponds with the estimated rating value, the plurality of item attributes of an item that corresponds with the estimated rating value, and the plurality of weights that corresponds with the estimated rating value; and
generate at least one item that includes features corresponding to the plurality of weights.

2. The apparatus of claim 1, wherein the plurality of weights is based on:
a plurality of consumer weights of a consumer that corresponds with the plurality of weights; and
a plurality of item weights of an item that corresponds with the plurality of weights.

3. The apparatus of claim 2, wherein a weight of the plurality of weights is based on a product of a consumer weight and an item weight that corresponds with the weight.

4. The apparatus of claim 3, wherein an estimated rating value of an item and a consumer is based on a sum of products of a consumer attribute, a consumer weight, an item attribute, and an item weight for each attribute that corresponds with the item and the consumer.

5. The apparatus of claim 4, wherein the training of a model includes minimizing a loss function by updating a plurality of consumer attributes of each consumer, a plurality of item attributes of each item, and a plurality of weights for each attribute of each combination of a consumer and an item, wherein the loss function is based on a difference between the consumption data and the estimated consumption data and a difference between the rating data and the estimated rating data.

6. The apparatus of claim 1, wherein the instructions further cause the processor to:
generate a recommendation of an item to a consumer based on the estimated rating values of the consumer and each item in the estimated rating data.

7. The apparatus of claim 6, wherein the obtaining of the plurality of rating values includes receiving a rating value from a consumer who bought an item from an Electronic Commerce (EC) site, and the obtaining of the plurality of consumption values includes updating a consumption value in response to receiving the rating value that corresponds with the consumption value.

8. The apparatus of claim 1, wherein the instructions further cause the processor to:
generate a recommendation of an item based on a sum of the estimated rating values of each corresponding item.

9. The apparatus of claim 1, wherein the instructions further cause the processor to:
generate an item that maximizes a rating value or a sum of rating values of one or more consumers based on the plurality of item attributes of each item and rating values that correspond with each item,
wherein each item is data to be presented to a consumer.

10. The apparatus of claim 1, wherein the instructions further cause the processor to:
obtain gradients of a loss function in each direction as a result of differential; and
update values of attributes and weights according to gradients to minimize the loss function.

11. A method comprising:
obtaining a plurality of consumption values, wherein each consumption value indicates whether a consumer among a plurality of consumers has rated an item among a plurality of items;
obtaining a plurality of rating values, wherein each rating value represents a rating of an item by a consumer for each consumption value indicating that the corresponding consumer rated the corresponding item;
training, using a processor, a model that generates an estimated consumption value and estimated rating value by utilizing a plurality of consumer attributes for each consumer that represent preferences of consumers before consumption, a plurality of item attributes for each of the plurality of items that represent a plurality of features of each of the plurality of items focused on before consumption, and a plurality of weights for each attribute of each combination of a consumer and an item that represent features of the items focused on before consumption and preferences after consumption,
wherein the training a model includes minimizing a loss function by updating a vector of consumer attributes $u_i$ for each consumer i, a vector of item attributes $v_j$ for each item j, a vector of consumer weights $g_i$ for each consumer i, and a vector of item weights $h_j$ for each item j, wherein the loss function is based on a difference between the consumption data (C) and the estimated consumption data ($\tilde{C}$) and a difference between the rating data (R) and the estimated rating data ($\tilde{R}$), wherein $\tilde{R}$ is an N×M matrix represented as follows:

$$\tilde{R} = \tilde{C}^{\#} \circ (G \circ U)^T (H \circ V)$$

where $U=(u_i, \ldots, u_j, \ldots, u_N)$, $V=(v_i, \ldots, v_j, \ldots, v_M)$, $G=(g_i, \ldots, g_j, \ldots, g_N)$, $H=(h_i, \ldots, h_j, \ldots, h_M)$, is an inverse matrix for a Hadamard product, N is a number of consumers, and M is a number of items; and wherein each estimated consumption value is a function of the plurality of weights for each attribute of each combination of each consumer and each item that corresponds with the estimated consumption value, each estimated rating value is a function of the plurality of consumer attributes of a consumer that corresponds with the estimated rating value, the plurality of item attributes of an item that corresponds with the estimated rating value, and the plurality of weights that corresponds with the estimated rating value; and generating at least one item that includes features corresponding to the plurality of weights.

12. The method of claim 11, wherein the plurality of weights is based on:
   a plurality of consumer weights of a consumer that corresponds with the plurality of weights; and
   a plurality of item weights of an item that corresponds with the plurality of weights.

13. The method of claim 12, wherein a weight of the plurality of weights is based on a product of a consumer weight and an item weight that corresponds with the weight.

14. The method of claim 13, wherein an estimated rating value of an item and a consumer is based on a sum of products of a consumer attribute, a consumer weight, an item attribute, and an item weight for each attribute that corresponds with the item and the consumer.

15. The method of claim 14, wherein the training of a model includes minimizing a loss function by updating a plurality of consumer attributes of each consumer, a plurality of item attributes of each item, and a plurality of weights for each attribute of each combination of a consumer and an item, wherein the loss function is based on a difference between the consumption data and the estimated consumption data and a difference between the rating data and the estimated rating data.

16. A computer program product comprising a computer readable storage medium having program instructions embodied therewith, the program instructions executable by a computer to cause the computer to perform operations comprising:
   obtaining a plurality of consumption values, wherein each consumption value indicates whether a consumer among a plurality of consumers has rated an item among a plurality of items;
   obtaining a plurality of rating values, wherein each rating value represents a rating of an item by a consumer for each consumption value indicating that the corresponding consumer rated the corresponding item;
   training a model that generates an estimated consumption value and estimated rating value by utilizing a plurality of consumer attributes for each consumer that represent preferences of consumers before consumption, a plurality of item attributes for each of the plurality of items that represent a plurality of different features of each of the plurality of items focused on before consumption, and a plurality of weights for each attribute of each combination of a consumer and an item that represent features of the items focused on before consumption and preferences after consumption,
   wherein the training a model includes minimizing a loss function by updating a vector of consumer attributes $u_i$ for each consumer i, a vector of item attributes $v_j$ for each item j, a vector of consumer weights $g_i$ for each consumer i, and a vector of item weights $h_j$ for each item j, wherein the loss function is based on a difference between the consumption data (C) and the estimated consumption data ($\tilde{C}$) and a difference between the rating data (R) and the estimated rating data ($\tilde{R}$), wherein $\tilde{R}$ is an N×M matrix represented as follows:

$$\tilde{R} = \tilde{C}^\# \circ (G \circ U)^T (H \circ V)$$

where $U=(u_i, \ldots, u_j, \ldots, u_N)$, $V=(v_i, \ldots, v_j, \ldots, v_M)$, $G=(g_i, \ldots, g_j, \ldots, g_N)$, $H=(h_i, \ldots, h_j, \ldots, h_M)$, $\circ$ is an inverse matrix for a Hadamard product, N is a number of consumers, and M is a number of items;

wherein each estimated consumption value is a function of the plurality of weights for each attribute of each combination of each consumer and each item that corresponds with the estimated consumption value, each estimated rating value is a function of the plurality of consumer attributes of a consumer that corresponds with the estimated rating value, the plurality of item attributes of an item that corresponds with the estimated rating value, and the plurality of weights that corresponds with the estimated rating value; and generating at least one item that includes features corresponding to the plurality of weights.

17. The computer program product of claim 16, wherein the plurality of weights is based on:
   a plurality of consumer weights of a consumer that corresponds with the plurality of weights; and
   a plurality of item weights of an item that corresponds with the plurality of weights.

18. The computer program product of claim 17, wherein a weight of the plurality of weights is based on a product of a consumer weight and an item weight that corresponds with the weight.

19. The computer program product of claim 18, wherein an estimated rating value of an item and a consumer is based on a sum of products of a consumer attribute, a consumer weight, an item attribute, and an item weight for each attribute that corresponds with the item and the consumer.

* * * * *